United States Patent Office 2,785,157
Patented Mar. 12, 1957

2,785,157

BENZOTHIAZOLEAZOANILINE COMPOUNDS

James M. Straley and David J. Wallace, Kingsport, Tenn., assignors to Eastman Kodak Company, Rochester, N. Y., a corporation of New Jersey No Drawing. Application November 5, 1952, Serial No. 318,952

10 Claims. (Cl. 260—158)

This invention relates to new azo compounds and their application to the art of dyeing or coloring.

We have discovered that the azo compounds having the general formula:

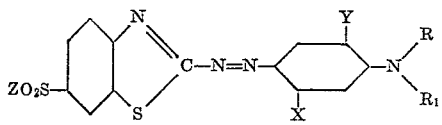

wherein R represents a hydrogen atom, an alkyl group having 1 to 4 carbon atoms, a hydroxyalkyl group having 2 to 4 carbon atoms, an alkoxyalkyl group having 3 to 4 carbon atoms, a cyanoalkyl group having 3 to 5 carbon atoms, a β-acetoxyethyl group, a carbomethoxymethyl group, a carboethoxymethyl group, a β-carbomethoxyethyl group or a β-carboethoxyethyl group, $R_1$ represents an alkyl group having 1 to 4 carbon atoms, a hydroxyalkyl group having 2 to 4 carbon atoms, an alkoxyalkyl group having 3 to 4 carbon atoms, a cyanoalkyl group having 3 to 5 carbon atoms, a β-acetoxyethyl group, a carbomethoxymethyl group, a carboethoxymethyl group, a β-carbomethoxyethyl group, a β-carboethoxyethyl group, a β,β-difluoroethyl group, a β,β-difluoro-n-propyl group, a γ,γ-difluoropropyl group, a γ,γ-difluoro-n-butyl group, a δ,δ-difluoro-n-amyl group, a β,β,β-trifluoroethyl group, a γ,γ,γ-trifluoropropyl group or a δ,δ,δ-trifluorobutyl group, X represents a hydrogen atom, a bromine atom, a chlorine atom, a methyl group, an ethyl group, a methoxy group, an ethoxy group, an acetamino group, an n-propionylamino group or an n-butyrylamino group, Y represents a hydrogen atom, a methyl group, an ethyl group, a methoxy group or an ethoxy group and Z represents an allyl group or an alkyl group having 1 to 4 carbon atoms, are valuable dyes for coloring textile materials made of or containing a cellulose alkyl carboxylic acid ester having 2 to 4 carbon atoms in the acid groups thereof. They are especially of use for the coloration of cellulose acetate textile materials and, accordingly, their utility as dyes is described more particularly with reference to the dyeing or coloration of cellulose acetate textile materials. When applied to the aforesaid textile materials, they give scarlet, red, pink, reddish-violet, violet and blue dyeings. The compounds of our invention also color wool, silk, nylon, polyethylene terephthalate and modified polyacrylonitrile textile materials similar colors but in general they are not as good dyes for these latter materials as they are for cellulose acetate.

It is an object of our invention to provide new azo compounds. Another object is to provide a satisfactory process for the preparation of our new azo compounds. A further object is to provide dyed textile materials, especially cellulose acetate textile materials, which have good fastness to light and gas.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate propionate and cellulose acetate butyrate.

The new azo compounds of our invention are prepared by diazotizing a 2-amino-6-(alkyl or allyl)sulfonylbenzothiazole having the formula:

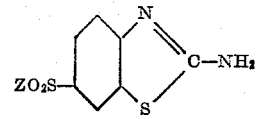

and coupling the diazonium compound obtained with a compound having the formula:

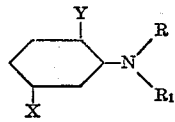

R, $R_1$, X, Y and Z in the foregoing formulas have the meaning previously assigned to them.

The 2-amino-6-(alkyl or allyl)sulfonylbenzothiazole compounds used in the preparation of the new azo compounds of our invention may be diazotized in sulfuric acid or mixtures of mineral and organic acids, following which the subsequent coupling reaction can be carried out, for example, in mineral acids or organic acids. However, it is preferred to diazotize the 2-aminobenzothiazole compound in moderately strong sulfuric acid and couple in moderately weak sulfuric acid. When the diazotization and coupling reactions are carried out in accordance with the preferred procedure, it is usually unnecessary to neutralize the sulfuric acid in order to obtain the dye since upon sufficient dilution with water the dye-sulfate is hydrolyzed and the free dye precipitates in solid form. This is a considerable advantage over the use of an organic acid in coupling because the organic acid usually has to be neutralized with the result that the dyestuff is first released in an oily or sticky state from which it is difficult to obtain the dyestuff in a pure form.

2-amino-6-(alkyl or allyl)sulfonylbenzothiazole compounds used in the preparation of the azo compounds of our invention are 2-amino-6-methylsulfonylbenzothiazole, 2-amino-6-ethylsulfonylbenzothiazole, 2-amino-6 - propylsulfonylbenzothiazole, 2 - amino - 6 - isopropylsulfonylbenzothiazole, 2-amino-6-n-butyl-sulfonylbenzothiazole, 2-amino-6-isobutylsulfonylbenzothiazole and 2-amino-6-allylsulfonylbenzothiazole. The use of 2-amino-6-methylsulfonylbenzothiazole is ordinarily preferred.

Illustrative of the alkyl groups represented by R and $R_1$ are the methyl, the ethyl, the n-propyl, the isopropyl and the n-butyl groups. Illustrative of the hydroxyalkyl groups represented by R and $R_1$ are the β-hydroxyethyl, the β-hydroxypropyl, the γ-hydroxypropyl, the β,γ-dihydroxypropyl, the β-methyl-β,γ-dihydroxypropyl and the δ-hydroxybutyl groups. Illustrative of the alkoxyalkyl groups represented by R and $R_1$ are the β-methoxyethyl and the β-ethoxyethyl groups. Cyanoalkyl groups having 3 to 5 carbon atoms are the β-cyanoethyl, the γ-cyanopropyl and the δ-cyanobutyl groups. Alkyl groups represented by Z include, for example, the methyl, the ethyl, the n-propyl, the isopropyl, the n-butyl and the isobutyl groups.

The new azo compounds of our invention are characterized in that they give dyeings on textile materials made of or containing a cellulose alkyl carboxylic acid ester having 2 to 4 carbon atoms in the acid groups thereof, especially cellulose acetate textile materials, which have excellent fastness to light and gas and which particularly excel in brightness. These dyeings possess the further advantages of being fast to sublimation, of being easily dischargeable to pure white shades and of having good wash-fastness. The red dyes of our invention possess a slight blue cast which is very desirable in the preparation of attractive combination shades.

The following examples illustrate the azo compounds of our invention and their manner of preparation. Parts are expressed as parts by weight.

EXAMPLE 1

57 parts of 2-amino-6-methylsulfonylbenzothiazole were dissolved in 1250 parts of 50% aqueous sulfuric acid at 90° C. The resulting solution was cooled to −10° C. and a solution of 17.5 parts of sodium nitrite dissolved in 125 parts of concentrated sulfuric acid was added while maintaining the temperature below −3° C. The reaction mixture resulting was stirred at −5° C. until the diazotization reaction which takes place was complete. The diazonium reaction mixture thus obtained was added with good stirring to a solution of 46.5 parts of N-β-hydroxyethyl-N-β-cyanoethylaniline in 1250 parts of 10% aqueous sulfuric acid at −5° C. Upon completion of the coupling reaction which takes place, the reaction product was recovered on the filter by filtration and stirred in 6000 parts of water for 30 minutes. The free dyestuff was recovered by filtration, washed with water until the washings were colorless and dried at 60° C. 67 to 75 parts of a dye compound having the formula:

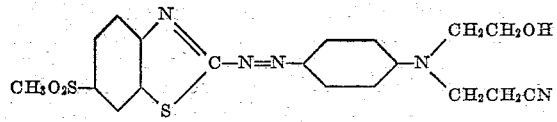

were obtained. It colors cellulose acetate textile materials brilliant red shades which have excellent fastness to light and gas. The dyeings obtained with this dye compound are likewise fast to sublimation and are easily dischargeable to pure white shades.

EXAMPLE 2

57 parts of 2-amino-6-methylsulfonylbenzothiazole were diazotized and the diazonium compound obtained was coupled with 50 parts of N-β,β-difluoroethyl-N-β-hydroxyethylaniline. Diazotization, coupling and recovery of the dye compound formed were carried out in accordance with the general procedure described in Example 1. The dye compound obtained colors cellulose acetate textile materials red shades which have excellent fastness to light and gas, which have excellent fastness to sublimation and which are easily dischargeable to pure white shades.

EXAMPLE 3

57 parts of 2-amino-6-methylsulfonylbenzothiazole were diazotized and the diazonium compound obtained was coupled with 58 parts of N-β-carbomethoxyethyl-N-β-cyanoethylaniline. Diazotization, coupling and recovery of the dye compound formed were carried out in accordance with the general procedure described in Example 1. The dye compound obtained colors cellulose acetate textile materials red shades which have excellent fastness to light and gas, which are fast to sublimation and which are easily dischargeable to pure white shades.

EXAMPLE 4

6.4 parts of 2-amino-6-allylsulfonylbenzothiazole were dissolved in 125 parts of 50% aqueous sulfuric acid at 0° C. and a solution of 2.1 parts of sodium nitrite in 20 parts of concentrated sulfuric acid was added thereto while maintaining the temperature of the reaction mixture at 0° C.–2° C. The reaction mixture thus obtained was stirred for 3 hours at 0° C.–3° C. until the diazotization reaction which takes place was complete. The diazonium reaction mixture thus obtained was then added slowly to a solution of 4.75 parts of N-β-hydroxyethyl-N-β-cyanoethylaniline in 80 parts of 50% aqueous sulfuric acid at 0° C.–2° C. The reaction mixture was stirred for one hour at 0° C.–2° C. (i. e. until the coupling reaction was complete) and then poured into 1000 parts of water and neutralized with sodium acetate. The reaction product precipitated and was recovered by filtration, washed well with water and dried in a vacuum at 50° C. A good yield of the dye compound having the formula:

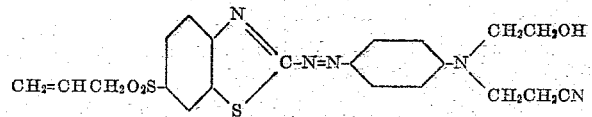

was obtained. It colors cellulose acetate textile materials brilliant red shades which have excellent fastness to light and gas, which are fast to sublimation and which are easily dischargeable to pure white shades.

EXAMPLE 5

6.4 parts of 2-amino-6-allylsulfonylbenzothiazole were diazotized and the diazonium compound obtained was coupled with 5 parts of N-β-hydroxyethyl-N-β,β-difluoroethylaniline. Diazotization, coupling and recovery of the dye compound formed were carried out in accordance with the procedure described in Example 4. 6.4 parts of a dye compound which colors cellulose acetate textile materials brilliant red shades which have excellent fastness to light and gas, which have excellent fastness to sublimation and which are easily dischargeable to pure white shades were obtained.

EXAMPLE 6

A solution of 48 parts of sodium nitrite in 250 parts of concentrated sulfuric acid were added to 500 parts of acetic-propionic acids (6:1) below 5° C. 142 parts of 2-amino-6-methylsulfonylbenzothiazole were then added and the reaction mixture was diluted slowly with 1750 parts of acetic-propionic acids (6:1) while maintaining the temperature below 10° C. Upon completion of the diazotization reaction which takes place, the diazonium solution was added at 5° C. to a solution of 102 parts of N-β-hydroxyethyl-N-β-cyanoethyl-m-toluidine in 2000 parts of acetic-propionic acids (6:1). The coupling reaction which takes place was completed by making the reaction mixture neutral to Congo red paper by the addition of sodium acetate or ammonium acetate. Following neutralization, the reaction mixture was held for 1 to 2 hours at 5° C. and then poured into 20 times its volume cold water. The sticky reaction product was recovered on the filter by filtration, washed well with water and dried. 160 parts of a dye compound which colors cellulose acetate textile materials bright red shades which are slightly bluer than those obtained with the dye compound of Example 1 were obtained. The dyeings have excellent fastness to light, gas and sublimation and are easily dischargeable to pure white shades. The acetic-propionic acid mixture employed in this example contained 6 parts by volume of acetic acid to 1 part by volume of propionic acid.

EXAMPLE 7

10 parts of 2-amino-6-methylsulfonylbenzothiazole were dissolved in 30 parts of formic acid and the resulting solution was added, with good stirring, to 150 parts of 45% aqueous sulfuric acid. A solution of 3 parts of sodium nitrite in 8 parts of water was added beneath the surface of the reaction mixture at a temperature below −5° C. Excess nitrous acid was destroyed by adding either urea or sulfamic acid, following which the reaction mixture was added rapidly to a solution of 10 parts of N-ethyl-N-β,γ-dihydroxypropyl-m-toluidine in 500 parts of 5% aqueous sulfuric acid. The reaction mixture was stirred for 30 minutes while maintaining the temperature below −5° C. and then made neutral to Congo red paper by the addition of sodium acetate. The dye compound which precipitated was recovered by filtration, washed well with water and air-dried. 11 parts of a dye compound which colors cellulose acetate textile materials brilliant reddish-violet shades which have excellent fastness to light, gas and sublimation and which are easily dischargeable to pure white shades were obtained.

EXAMPLE 8

6.1 parts of 2-amino-6-ethylsulfonylbenzothiazole were diazotized and the diazonium compound obtained was coupled with 4.75 parts of N-$\beta$-hydroxyethyl-N-$\beta$-cyanoethylaniline. Diazotization, coupling and recovery of the dye compound formed were carried out in accordance with the procedure described in Example 4. 7.5 parts of a dye compound which colors cellulose acetate textile materials brilliant red shades which have excellent fastness to light, gas and sublimation and which are readily dischargeable to pure white shades were obtained.

EXAMPLE 9

22.8 parts of 2-amino-6-methylsulfonylbenzothiazole were diazotized and the diazonium compound obtained was coupled with 19.5 parts of N,N-di-$\beta$-hydroxyethyl-m-toluidine. Diazotization, coupling and recovery of the dye compound formed were carried out in accordance with the general procedure described in Example 1. The dye compound thus obtained colors cellulose acetate textile materials reddish-violet shades having good fastness properties and good dischargeability.

EXAMPLE 10

22.8 parts of 2-amino-6-methylsulfonylbenzothiazole were diazotized and the diazonium compound obtained was coupled with 22.3 parts of N,N-di-$\beta$-methoxyethyl-m-toluidine. Diazotization, coupling and recovery of the dye compound formed were carried out in accordance with the general procedure described in Example 1. The dye compound thus obtained colors cellulose acetate textile materials reddish-violet shades having good fastness properties and good dischargeability.

EXAMPLE 11

22.8 parts of 2-amino-6-methylsulfonylbenzothiazole were diazotized and the diazonium compound obtained was coupled with 24.6 parts of N,N-di-$\beta$-hydroxyethyl-3-chloro-6-methoxyaniline. Diazotization, coupling and recovery of the dye compound formed were carried out in accordance with the general procedure described in Example 1. The dye compound thus obtained colors cellulose acetate textile materials violet shades having good fastness properties and good dischargeability.

EXAMPLE 12

22.8 parts of 2-amino-6-methylsulfonylbenzothiazole were diazotized and the diazonium compound obtained was coupled with 23.8 parts of N,N-di-$\beta$-hydroxyethyl-m-acetylaminoaniline. Diazotization, coupling and recovery of the dye compound formed were carried out in accordance with the general procedure described in Example 1. The dye compound thus obtained colors cellulose acetate textile materials reddish-violet shades having good fastness properties and good dischargeability.

EXAMPLE 13

22.8 parts of 2-amino-6-methylsulfonylbenzothiazole were diazotized and the diazonium compound obtained was coupled with 32.2 parts of N,N-di-$\beta$,$\beta$-difluoroethyl-3-acetylamino-6-ethoxy aniline. Diazotization, coupling and recovery of the dye compound formed were carried out in accordance with the general procedure described in Example 1. The dye compound thus obtained colors cellulose acetate textile materials violet shades having good fastness properties and good dischargeability.

EXAMPLE 14

22.8 parts of 2-amino-6-methylsulfonylbenzothiazole were diazotized and the diazonium compound obtained was coupled with 22.5 parts of N-$\beta$-hydroxyethyl-N-$\beta$-cyanoethyl-m-chloroaniline. Diazotization, coupling and recovery of the dye compound formed were carried out in accordance with the general procedure described in Example 1. The dye compound thus obtained colors cellulose acetate textile materials red shades having good fastness properties and good dischargeability.

EXAMPLE 15

22.8 parts of 2-amino-6-methylsulfonylbenzothiazole were diazotized and the diazonium compound obtained was coupled with 14.6 parts of N-$\beta$-cyanoethylaniline. Diazotization, coupling and recovery of the dye compound formed were carried out in accordance with the general procedure described in Example 1. The dye compound thus obtained colors cellulose acetate textile materials scarlet shades having good fastness properties and good dischargeability.

EXAMPLE 16

22.8 parts of 2-amino-6-methylsulfonylbenzothiazole were diazotized and the diazonium compound obtained was coupled with 19.9 parts of N,N-di-$\beta$-cyanoethylaniline. Diazotization, coupling and recovery of the dye compound formed were carried out in accordance with the general procedure described in Example 1. The dye compound thus obtained colors cellulose acetate textile materials scarlet shades having good fastness properties and good dischargeability.

EXAMPLE 17

22.8 parts of 2-amino-6-methylsulfonylbenzothiazole were diazotized and the diazonium compound obtained was coupled with 20.4 parts of N-$\beta$-methoxyethyl-N-$\beta$-cyanoethylaniline. Diazotization, coupling and recovery of the dye compound formed were carried out in accordance with the general procedure described in Example 1. The dye compound thus obtained colors cellulose acetate textile materials red shades having good fastness properties and good dischargeability.

EXAMPLE 18

24.2 parts of 2 - amino - 6 - ethylsulfonylbenzothiazole were diazotized and the diazonium compound obtained was coupled with 20.1 parts of N-$\beta$-hydroxyethyl-N-$\beta$,$\beta$-difluoroethylaniline. Diazotization, coupling and recovery of the dye compound formed were carried out in accordance with the general procedure described in Example 1. The dye compound thus obtained colors cellulose acetate textile materials red shades having good fastness properties and good dischargeability.

EXAMPLE 19

25.6 parts of 2-amino-6-isopropylsulfonylbenzothiazole were diazotized and the diazonium compound obtained was coupled with 19 parts of N-$\beta$-hydroxythethyl-N-$\beta$-cyanoethylaniline. Diazotization, coupling and recovery of the dye compound formed were carried out in accordance with the general procedure described in Example 1. The dye compound thus obtained colors cellulose acetate textile materials red shades having good fastness properties and good dischargeability.

EXAMPLE 20

25.4 parts of 2-amino-6-allylsulfonylbenzothiazole were diazotized and the diazonium compound obtained was coupled with 23.2 parts of N-$\beta$-carbomethoxyethyl-N-$\beta$-cyanoethylaniline. Diazotization, coupling and recovery of the dye compound formed were carried out in accordance with the general procedure described in Example 1. The dye compound thus obtained colors cellulose acetate textile materials red shades having good fastness properties and good dischargeability.

EXAMPLE 21

25.4 parts of 2-amino-6-allylsulfonylbenzothiazole were diazotized and the diazonium compound obtained was coupled with 20.4 parts of N-β-methoxyethyl-N-β-cyanoethylaniline. Diazotization, coupling and recovery of the dye compound formed were carried out in accordance with the general procedure described in Example 1. The dye compound thus obtained colors cellulose acetate textile materials red shades having good fastness properties and good dischargeability.

EXAMPLE 22

27 parts of 2-amino-6-isobutylsulfonylbenzothiazole were diazotized and the diazonium compound obtained was coupled with 19 parts of N-β-hydroxyethyl-N-β-cyanoethylaniline. Diazotization, coupling and recovery of the dye compound formed were carried out in accordance with the general procedure described in Example 1. The dye compound thus obtained colors cellulose acetate textile materials red shades having good fastness properties and good dischargeability.

EXAMPLE 23

25.6 parts of 2-amino-6-n-propylsulfonylbenzothiazole were diazotized and the diazonium compound obtained was coupled with 19 parts of N-β-hydroxyethyl-N-β-cyanoethylaniline. Diazotization, coupling and recovery of the dye compound formed were carried out in accordance with the general procedure described in Example 1. The dye compound thus obtained colors cellulose acetate textile materials red shades having good fastness properties and good dischargeability.

EXAMPLE 24

27 parts of 2-amino-6-n-butylsulfonylbenzothiazole were diazotized and the diazonium compound obtained was coupled with 19 parts of N-β-hydroxyethyl-N-β-cyanoethylaniline. Diazotization, coupling and recovery of the dye compound formed were carried out in accordance with the general procedure described in Example 1. The dye compound thus obtained colors cellulose acetate textile materials red shades having good fastness properties and good dischargeability.

EXAMPLE 25

22.8 parts of 2-amino-6-methylsulfonylbenzothiazole were diazotized and the diazonium compound obtained was coupled with 20.4 parts of N-γ-hydroxypropyl-N-β-cyanoethylaniline. Diazotization, coupling and recovery of the dye compound formed were carried out in accordance with the general procedure described in Example 1. The dye compound thus obtained colors cellulose acetate textile materials red shades having good fastness properties and good dischargeability.

EXAMPLE 26

22.8 parts of 2-amino-6-methylsulfonylbenzothiazole were diazotized and the diazonium compound obtained was coupled with 21.8 parts of N-δ-hydroxybutyl-N-β-cyanoethylaniline. Diazotization, coupling and recovery of the dye compound formed were carried out in accordance with the general procedure described in Example 1. The dye compound thus obtained colors cellulose acetate textile materials red shades having good fastness properties and good dischargeability.

EXAMPLE 27

22.8 parts of 2-amino-6-methylsulfonylbenzothiazole were diazotized and the diazonium compound obtained was coupled with 20.9 parts of N-β-ethoxyethyl-N-β-hydroxyethylaniline. Diazotization, coupling and recovery of the dye compound formed were carried out in accordance with the general procedure described in Example 1. The dye compound thus obtained colors cellulose acetate textile materials red shades having good fastness properties and good dischargeability.

EXAMPLE 28

22.8 parts of 2-amino-6-methylsulfonylbenzothiazole were diazotized and the diazonium compound obtained was coupled with 21.8 parts of N-δ-cyanobutyl-N-β-hydroxyethylaniline. Diazotization, coupling and recovery of the dye compound formed were carried out in accordance with the general procedure described in Example 1. The dye compound thus obtained colors cellulose acetate textile materials red shades having good fastness properties and good dischargeability.

EXAMPLE 29

22.8 parts of 2-amino-6-methylsulfonylbenzothiazole were diazotized and the diazonium compound obtained was coupled with 19.3 parts of N-n-butyl-N-β-hydroxyethylaniline. Diazotization, coupling and recovery of the dye compound formed were carried out in accordance with the general procedure described in Example 1. The dye compound thus obtained colors cellulose acetate textile materials reddish-violet shades having good fastness properties and good dischargeability.

EXAMPLE 30

22.8 parts of 2-amino-6-methylsulfonylbenzothiazole were diazotized and the diazonium compound obtained was coupled with 23.3 parts of N-β-acetoxyethyl-N-β-hydroxyethylaniline. Diazotization, coupling and recovery of the dye compound formed were carried out in accordance with the general procedure described in Example 1. The dye compound thus obtained colors cellulose acetate textile materials reddish-violet shades having good fastness properties and good dischargeability.

EXAMPLE 31

22.8 parts of 2-amino-6-methylsulfonylbenzothiazole were diazotized and the diazonium compound obtained was coupled with 21.8 parts of N-carbomethoxymethyl-N-β-cyanoethylaniline. Diazotization, coupling and recovery of the dye compound formed were carried out in accordance with the general procedure described in Example 1. The dye compound thus obtained colors cellulose acetate textile materials red shades having good fastness properties and good dischargeability.

EXAMPLE 32

22.8 parts of 2-amino-6-methylsulfonylbenzothiazole were diazotized and the diazonium compound obtained was coupled with 23.4 parts of N-β-carboethoxyethyl-N-β-cyanoethylaniline. Diazotization, coupling and recovery of the dye compound formed were carried out in accordance with the general procedure described in Example 1. The dye compound thus obtained colors cellulose acetate textile materials red shades having good fastness properties and good dischargeability.

EXAMPLE 33

22.8 parts of 2-amino-6-methylsulfonylbenzothiazole were diazotized and the diazonium compound obtained was coupled with 21.5 parts of N-β,β-difluoro-n-propyl-N-β-hydroxyethylaniline. Diazotization, coupling and recovery of the dye compound formed were carried out in accordance with the general procedure described in Example 1. The dye compound thus obtained colors cellulose acetate textile materials red shades having good fastness properties and good dischargeability.

EXAMPLE 34

22.8 parts of 2-amino-6-methylsulfonylbenzothiazole were diazotized and the diazonium compound obtained was coupled with 21.5 parts of N-γ,γ-difluoropropyl-N-β-hydroxyethylaniline. Diazotization, coupling and recovery of the dye compound formed were carried out in accordance with the general procedure described in Ex-

EXAMPLE 35

22.8 parts of 2-amino-6-methylsulfonylbenzothiazole were diazotized and the diazonium compound obtained was coupled with 22.9 parts of N-γ,γ-difluoro-n-butyl-N-β-hydroxyethylaniline. Diazotization, coupling and recovery of the dye compound formed were carried out in accordance with the general procedure described in Example 1. The dye compound thus obtained colors cellulose acetate textile materials red shades having good fastness properties and good dischargeability.

EXAMPLE 36

22.8 parts of 2-amino-6-methylsulfonylbenzothiazole were diazotized and the diazonium compound obtained was coupled with 24.3 parts of N-δ,δ-difluoro-n-amyl-N-β-hydroxyethylaniline. Diazotization, coupling and recovery of the dye compound formed were carried out in accordance with the general procedure described in Example 1. The dye compound thus obtained colors cellulose acetate textile materials red shades having good fastness properties and good dischargeability.

EXAMPLE 37

22.8 parts of 2-amino-6-methylsulfonylbenzothiazole were diazotized and the diazonium compound obtained was coupled with 21.9 parts of N-β,β,β-trifluoroethyl-N-β-hydroxyethylaniline. Diazotization, coupling and recovery of the dye compound formed were carried out in accordance with the general procedure described in Example 1. The dye compound thus obtained colors cellulose acetate textile materials red shades having good fastness properties and good dischargeability.

EXAMPLE 38

22.8 parts of 2-amino-6-methylsulfonylbenzothiazole were diazotized and the diazonium compound obtained was coupled with 23.3 parts of N-γ,γ,γ-trifluoropropyl-N-β-hydroxyethylaniline. Diazotization, coupling and recovery of the dye compound formed were carried out in accordance with the general procedure described in Example 1. The dye compound thus obtained colors cellulose acetate textile materials red shades having good fastness properties and good dischargeability.

EXAMPLE 39

22.8 parts of 2-amino-6-methylsulfonylbenzothiazole were diazotized and the diazonium compound obtained was coupled with 24.7 parts of N-δ,δ,δ-trifluorobutyl-N-β-hydroxyethylaniline. Diazotization, coupling and recovery of the dye compound formed were carried out in accordance with the general procedure described in Example 1. The dye compound thus obtained colors cellulose acetate textile materials red shades having good fastness properties and good dischargeability.

EXAMPLE 40

22.8 parts of 2-amino-6-methylsulfonylbenzothiazole were diazotized and the diazonium compound obtained was coupled with 26.1 parts of N-β-hydroxyethyl-N-β-cyanoethyl-m-n-propionylaminoaniline. Diazotization, coupling and recovery of the dye compound formed were carried out in accordance with the general procedure described in Example 1. The dye compound thus obtained colors cellulose acetate textile materials violet shades having good fastness properties and good dischargeability.

EXAMPLE 41

22.8 parts of 2-amino-6-methylsulfonylbenzothiazole were diazotized and the diazonium compound obtained was coupled with 22.2 parts of N-β-hydroxyethyl-m-n-butyrylaminoaniline. Diazotization, coupling and recovery of the dye compound formed were carried out in accordance with the general procedure described in Example 1. The dye compound thus obtained colors cellulose acetate textile materials reddish-violet shades having good fastness properties and good dischargeability.

The compounds tabulated hereinafter further illustrate the compounds of our invention. These compounds are prepared by diazotizing the diazo components named hereinafter and coupling the diazonium compounds obtained with the coupling components named hereinafter. The color given is that which the compounds color cellulose acetate textile materials. The diazotization, coupling and recovery operations are carried out in accordance with the procedure described hereinbefore.

*Table 1*

DIAZO COMPONENT: 2-AMINO-6-METHYLSULFONYLBENZOTHIAZOLE

|   | Coupling Component | Color |
|---|---|---|
| 1 | N-β,β-difluoroethyl-N-n-butylaniline | red. |
| 2 | N-β,β-difluoroethyl-N-β,γ-dihydroxypropylaniline | Do. |
| 3 | N-ethyl-N-β-hydroxyethyl-m-toluidine | reddish-violet. |
| 4 | N-β-cyanoethyl-N-β-acetoxyethylaniline | red. |
| 5 | N-β-hydroxyethylaniline | pink. |
| 6 | N-β-hydroxyethyl-m-toluidine | reddish-violet. |
| 7 | N-β-hydroxyethyl-N-β-carbomethoxyethylaniline | pink. |
| 8 | N-methylaniline | red. |
| 9 | N-n-propyl-N-β-hydroxyethylaniline | reddish-violet. |
| 10 | N-n-butyl-N-β-hydroxyethylaniline | Do. |
| 11 | N-β-cyanoethyl-N-β-hydroxyethyl-m-bromoaniline | red. |
| 12 | N-β-cyanoethyl-N-β-hydroxyethyl-m-ethylaniline | reddish-violet. |
| 13 | N-β-cyanoethyl-N-β-hydroxyethyl-m-methoxyaniline | Do. |
| 14 | N-β-cyanoethyl-N-β-hydroxypropyl-m-ethoxyaniline | Do. |
| 15 | N-β-cyanoethyl-N-β,γ-dihydroxypropyl-o-toluidine | red. |
| 16 | N-β-cyanoethyl-N-β-hydroxyethyl-o-ethylaniline | Do. |
| 17 | N-β-cyanoethyl-N-β-hydroxyethyl-o-methoxyaniline | Do. |
| 18 | N-β-cyanoethyl-N-β-hydroxyethyl-o-ethoxyaniline | Do. |
| 19 | N,N-di-β-hydroxyethyl-2,5-dimethoxyaniline | violet. |
| 20 | N,N-di-β-hydroxyethyl-2-methyl-5-methoxyaniline | Do. |
| 21 | N,N-di-β-cyanoethyl-2-methoxy-5-methylaniline | reddish-violet. |
| 22 | N-β-cyanoethyl-N-β-hydroxyethyl-2-methoxy-5-bromoaniline | violet. |
| 23 | N,N-di-β-hydroxyethyl-2-ethoxy-5-chloroaniline | Do. |

*Table 2*

DIAZO COMPONENT: 2-AMINO-6-ETHYLSULFONYLBENZOTHIAZOLE

|   | Coupling Component | Color |
|---|---|---|
| 1 | N,N-di-β-hydroxyethyl-m-toluidine | reddish-violet. |
| 2 | N,N-di-β-hydroxyethyl-2-methoxy-5-acetylaminoaniline | blue. |
| 3 | N,N-di-carbomethoxyethylaniline | reddish-violet. |
| 4 | N-β-carbomethoxyethyl-N-β-cyanoethylaniline | red. |
| 5 | N-β-methoxyethyl-N-β-cyanoethylaniline | Do. |
| 6 | N-β-ethoxyethyl-N-β-cyanoethylaniline | Do. |
| 7 | N-β-hydroxyethyl-N-β,β,β-trifluoroethylaniline | Do. |
| 8 | N-β-hydroxyethyl-N-δ,δ,δ-trifluorobutylaniline | Do. |
| 9 | N-β-hydroxyethyl-N-δ,δ-difluoro-n-amylaniline | Do. |
| 10 | N-γ,γ-difluoropropyl-N-β-cyanoethylaniline | Do. |

Table 3

DIAZO COMPONENT: 2-AMINO-6-ISOPROPYLSULFONYL-BENZOTHIAZOLE

| | Coupling Component | Color |
|---|---|---|
| 1 | N,N-di-β-hydroxyethylaniline | red. |
| 2 | N,N-di-β-hydroxyethyl-m-toluidine | reddish-violet. |
| 3 | N,N-di-β-cyanoethylaniline | red. |
| 4 | N - β - carbomethoxyethyl - N - ethylaniline | Do. |
| 5 | N - β,β - difluoroethyl - N - β - hydroxyethylaniline | Do. |
| 6 | N,N - di - β - hydroxyethyl - 3 - chloro - 6 - methoxyaniline | violet. |
| 7 | N,N - di - β - hydroxyethyl - 3 - bromo - 6 - methoxyaniline | Do. |
| 8 | N-β-cyanoethyl-N-β-methoxyethylaniline | red. |
| 9 | N-β-cyanoethyl-N-β-ethoxyethylaniline | Do. |
| 10 | N - β - cyanoethyl - N - β - carbomethoxyethylaniline | Do. |
| 11 | N - δ - cyanopropyl - N - β - carboethoxyethylaniline | Do. |
| 12 | N-β-hydroxyethylaniline | pink. |
| 13 | N-β,β-difluoroethylaniline | red. |

Table 4

DIAZO COMPONENT: 2-AMINO-6-N-PROPYLSULFONYL BENZOTHIAZOLE

| | Coupling Component | Color |
|---|---|---|
| 1 | N-β-cyanoethyl-N-β-methoxyethylaniline | red. |
| 2 | N - β - cyanoethyl - N - β - carbomethoxyethylaniline | Do. |
| 3 | N, N-di-β-hydroxyethyl-m-toluidine | reddish-violet. |
| 4 | N,N-di-β-cyanoethylaniline | red. |
| 5 | N - β,β - difluoroethyl - N - β - hydroxyethylaniline | Do. |
| 6 | N,N - di - β - hydroxyethyl - 3 - chloro - 6 - ethoxyaniline | violet. |
| 7 | N,N - di - β - hydroxyethyl - 2,5 - dimethoxyaniline | Do. |
| 8 | N - β,β,β - trifluoroethyl - N - β - hydroxyethylaniline | red. |
| 9 | N - β - hydroxyethyl - N - β - carboethoxyethylaniline | Do. |

Table 5

DIAZO COMPONENT: 2-AMINO-6-ISOBUTYLSULFONYL BENZOTHIAZOLE

| | Coupling Component | Color |
|---|---|---|
| 1 | N,N - di - β - hydroxyethyl - m - acetyl - aminoaniline | reddish-violet. |
| 2 | N - β,β - difluoroethyl - N - β - hydroxyethylaniline | red. |
| 3 | N,N - di - β - hydroxyethyl - 2 - methoxy - 5 - acetylaminoaniline | blue. |
| 4 | N - β - cyanoethyl - N - β - hydroxyethyl - m - toluidine | red. |
| 5 | N - β - cyanoethyl - N - β - carbomethoxyethylaniline | Do. |
| 6 | N,N-di-β-hydroxyethyl-m-chloroaniline | reddish-violet. |
| 7 | N - β,β,β - trifluoroethyl - N - β - hydroxyethylaniline | red. |
| 8 | N - γ,γ,γ - trifluoropropyl - N - β - hydroxyethylaniline | Do. |

Table 6

DIAZO COMPONENT: 2-AMINO-6-N-BUTYLSULFONYL-BENZOTHIAZOLE

| | Coupling Component | Color |
|---|---|---|
| 1 | N,N-di-β-cyanoethylaniline | red. |
| 2 | N-β-cyanoethyl-N-β-hydroxypropylaniline | Do. |
| 3 | N-β-cyanoethyl-N-δ-hydroxybutylaniline | Do. |
| 4 | N-β-cyanoethyl-N-β-methoxyethylaniline | Do. |
| 5 | N - β - cyanoethyl - N - β - carboethoxyethylaniline | Do. |
| 6 | N,N-di-β-hydroxyethyl-m-toluidine | reddish-violet. |
| 7 | N,N-di-β-hydroxyethyl-m-chloroaniline | Do. |
| 8 | N - β,β - difluoroethyl - N - β - hydroxyethylaniline | red. |
| 9 | N - β,β,β - trifluoroethyl - N - β - hydroxyethylaniline | Do. |
| 10 | N-β-hydroxyethylaniline | Do. |
| 11 | N-β-cyanoethylaniline | scarlet. |
| 12 | N-β,β-difluoroethylaniline | Do. |
| 13 | N-β,β,β-trifluoroethylaniline | Do. |

Table 7

DIAZO COMPONENT: 2-AMINO-6-ALLYLSULFONYLBENZOTHIAZOLE

| | Coupling Component | Color |
|---|---|---|
| 1 | N,N-di-β-carbomethoxyethylaniline | reddish-violet. |
| 2 | N - β - hydroxyethyl - N - β - cyanoethyl - m - chloroaniline | red. |
| 3 | N-β-methoxyethyl-N-ethylaniline | reddish-violet. |
| 4 | N - β - hydroxyethyl - N - β - cyanoethyl - m - toluidine | pink. |
| 5 | N - β,β - difluoroethyl-N-β-hydroxyethyl-m-toluidine | Do. |
| 6 | N - β,β,β - trifluoroethyl - N - β - hydroxyethyl-m-toluidine | Do. |
| 7 | N,N-di-β-cyanoethylaniline | scarlet. |
| 8 | N - β - hydroxyethyl - N - β - cyanoethyl - m - ethylaniline | pink. |

In order that the preparation of the azo compounds of our invention may be entirely clear, the preparation of certain intermediates used in their manufacture is described hereinafter.

Preparation of 2-amino-6-methylsulfonylbenzothiazole.—A solution of 200 parts of bromine in 300 parts of acetic acid was added over the course of about 1 hour to a mixture of 171 parts of p-aminophenylmethylsulfone and 202 parts of sodium thiocyanate in 1750 parts of acetic acid. The temperature was held below 35° C. during the addition and after complete addition of the bromine-acetic acid mixture, the reaction mixture was stirred for 18 hours. The reaction product was recovered on the filter by filtration, washed with acetic acid and then dispersed in 6000 parts of water. The reaction mixture thus obtained was heated to boiling and then an alkali such as caustic soda or sodium carbonate was added until the pH of the reaction mixture was about 6. The reaction mixture was then cooled, filtered and the reaction product which collected on the filter was washed well with water and dried at 120° C. 145 to 160 parts of 2-amino-6-methylsulfonylbenzothiazole were obtained as light yellow crystals melting at 226° C.–228° C.

Preparation of 2-acetylamino-6-thiocyanobenzothiazole.—To a solution of 18.6 parts of aniline and 30.4 parts of ammonium thiocyanate in 300 parts of acetic acid at 15° C. 14.2 parts of chlorine were bubbled in at 15° C.–17° C. 30 minutes after addition of the chlorine 15.6 parts of sodium acetate and 30.4 parts of ammonium thiocyanate were added to the reaction mixture. While holding the temperature of the reaction mixture below 35° C., 14.2 parts of chlorine were passed in and the reaction mixture was stirred overnight at room temperature. The solid present in the reaction mixture was recovered by filtration, washed with 50 parts of acetic acid and then suspended in 600 parts of water. The mixture thus obtained was heated to boiling and filtered. 30 parts of sodium acetate were added to the filtrate and the solid which precipitated was collected at 70° C. on a filter, washed with 200 parts of cold water and dried at 100° C. 30 parts of a product melting at 187° C.–188° C. were thus obtained.

30 parts of acetic anhydride were added at 80° C. to a solution of 52.6 parts of the above product in 81 parts of acetic acid, and the temperature of the reaction mixture was held at 80° C.–90° C. for one hour. The reaction mixture was then poured into 1000 parts of cold water and the product which precipitated was recovered by filtration, washed with 500 parts of water and then dried at 60° C. 62 parts of 2-acetylamino-6-thiocyanobenzothiazole melting at 247° C.–249° C. were thus obtained.

Preparation of 2-amino-6-ethylsulfonylbenzothiazole.—A solution of 26.4 parts of crystalline sodium sulfide and 24.9 parts of 2-acetylamino-6-thiocyanobenzothiazole in 150 parts of ethyl alcohol were refluxed together for 10 minutes and after cooling the reaction mixture to 20° C., 16.3 parts of ethyl iodide were added at one time and the reaction mixture resulting was refluxed for one hour. The reaction mixture was then poured into 1000 parts of water and the product which precipitated was recovered by filtration, washed well with water and dried at 60° C. 23.6 parts of 2-acetylamino-6-ethylthiobenzothiazole melting at 168° C.–169° C. were obtained. If desired, the quality of the product can be checked by hydrolyzing a little of the product with acid to 2-amino-6-ethylthiobenzothiazole melting at 137° C.–139° C.

19 parts of 30% aqueous hydrogen peroxide were added to a solution of 15.5 parts of 2-acetylamino-6-ethylthiobenzothiazole in 53 parts of acetic acid while maintaining the temperature of the reaction mixture between 80° C.–90° C. The reaction mixture was maintained at this temperature for one hour and then poured into 500 parts of cold water. The solid present in the reaction mixture was recovered by filtration and then suspended in a mixture of 800 parts of water and 100 parts of concentrated hydrochloric acid. The reaction mixture thus obtained was heated to boiling and then filtered. The filtrate was neutralized with sodium acetate, cooled to 25° C. and filtered. The product collected on the filter was washed with cold water and dried at 60° C. 8.5 parts of 2-amino-6-ethylsulfonylbenzothiazole melting at 173° C.–175° C. were thus obtained.

*Preparation of 2-amino-6-isopropylsulfonylbenzothiazole.*—This compound was prepared in accordance with the procedure described for the preparation of 2-amino-6-ethylsulfonylbenzothiazole using 17.76 parts of isopropyl iodide in place of ethyl iodide. The melting point of the 2-acetylamino-6-isopropylthiobenzothiazole formed during the process was 174° C.–175° C. while that of the final product 2-amino-6-isopropylsulfonylbenzothiazole was 207° C.–209° C.

2-amino-6-n-propylsulfonylbenzothiazole is similarly prepared by the use of 17.76 parts of n-propyl iodide in place of isopropyl iodide in the foregoing example.

*Preparation of 2-amino-6-isobutylsulfonylbenzothiazole.*—This compound was prepared in accordance with the procedure described for the preparation of 2-amino-6-ethylsulfonylbenzothiazole using 14.3 parts of isobutyl bromide in place of ethyl iodide. The melting point of the 2-acetylamino-6-isobutylthiobenzothiazole obtained was 167° C.–168° C. while that of the final product 2-amino-6-isobutylsulfonylbenzothiazole was 206° C.–207° C.

2-amino-6-n-butylsulfonylbenzothiazole is similarly prepared by using 14.3 parts of n-butyl bromide in place of isobutyl bromide in the foregoing example.

*Preparation of 2-amino-6-allylsulfonylbenzothiazole.*—This compound was prepared in accordance with the procedure described for the preparation of 2-amino-6-ethylsulfonylbenzothiazole using 12.7 parts of allyl bromide in place of ethyl iodide. The melting point of the 2-acetylamino-6-allylthiobenzothiazole obtained during the process was 170° C.–171° C. while that of the final product 2-amino-6-allylsulfonylbenzothiazole was 172° C.–174° C.

The azo dye compounds of our invention can be applied to the textile materials named hereinbefore in the form of an aqueous dispersion and are ordinarily so applied. To illustrate, the dye compound is finely ground with a dispersing agent such as sodium lignin sulfonate, Turkey red oil, soap, or an oleyl glyceryl sulfate and the resulting mixture is dispersed in water. The dye bath thus prepared is heated to a temperature approximating 45° C.–55° C. and the textile material to be dyed is immersed in the dyebath, following which the temperature is gradually raised to 80° C.–90° C. and maintained at this temperature until dyeing is complete, usually one-half to two hours. From time to time throughout the dyeing operation, the material is worked to promote even dyeing. Upon completion of the dyeing operation, the textile material is removed from the dyebath, washed with an aqueous soap solution, rinsed well with water and dried.

Widely varying amounts of dye can be used in the dyeing operation. The amount of dye used can be, for example, ⅓ to 3% (by weight) of that of the textile material although lesser or greater amounts of dye can be employed.

We claim:

1. The azo compounds having the general formula:

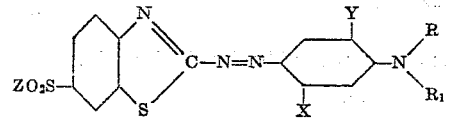

wherein R represents a member selected from the group consisting of a hydrogen atom, an alkyl group having 1 to 4 carbon atoms, a hydroxyalkyl group having 2 to 4 carbon atoms, an alkoxyalkyl group having 3 to 4 carbon atoms, a cyanoalkyl group having 3 to 5 carbon atoms, a β-acetoxyethyl group, a carbomethoxymethyl group, a carboethoxymethyl group, a β-carbomethoxyethyl group and a β-carboethoxyethyl group, $R_1$ represents a member selected from the group consisting of an alkyl group having 1 to 4 carbon atoms, a hydroxyalkyl group having 2 to 4 carbon atoms, an alkoxyalkyl group having 3 to 4 carbon atoms, a cyanoalkyl group having 3 to 5 carbon atoms, a β-acetoxyethyl group, a carbomethoxymethyl group, a carboethoxymethyl group, a β-carbomethoxyethyl group, a β-carboethoxyethyl group, a β,β-difluoroethyl group, a β,β-difluoro-n-propyl group, a γ,γ-difluoropropyl group, a γ,γ-difluoro-n-butyl group, a δ,δ-difluoro-n-amyl group, a β,β,β-trifluoroethyl group, a γ,γ,γ-trifluoropropyl group and a δ,δ,δ-trifluorobutyl group, X represents a member selected from the group consisting of a hydrogen atom, a bromine atom, a chlorine atom, a methyl group, an ethyl group, a methoxy group, an ethoxy group, an acetamino group, an n-propionylamino group and an n-butyrylamino group, Y represents a member selected from the group consisting of a hydrogen atom, a methyl group, an ethyl group, a methoxy group and an ethoxy group and Z represents a member selected from the group consisting of an allyl group and an alkyl group having 1 to 4 carbon atoms.

2. The azo compounds having the general formula:

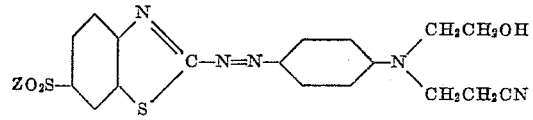

wherein Z represents an alkyl group having 1 to 4 carbon atoms.

3. The azo compounds having the general formula:

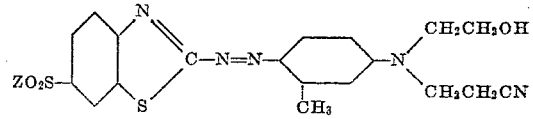

wherein Z represents an alkyl group having 1 to 4 carbon atoms.

4. The azo compounds having the general formula:

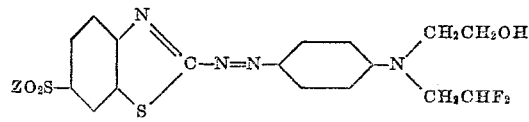

wherein Z represents an alkyl group having 1 to 4 carbon atoms.

5. The azo compounds having the general formula:

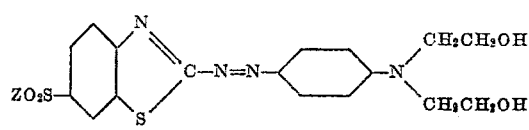

wherein Z represents an alkyl group having from 1 to 4 carbon atoms.

6. The azo compound having the formula:

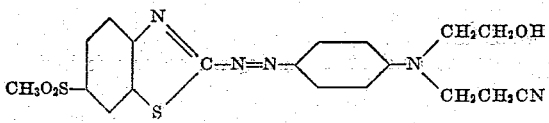

7. The azo compound having the formula:

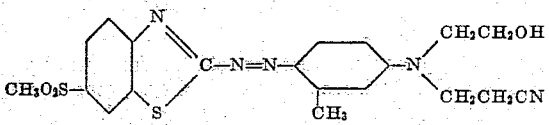

8. The azo compound having the formula:

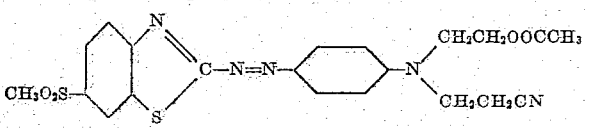

9. The azo compound having the formula:

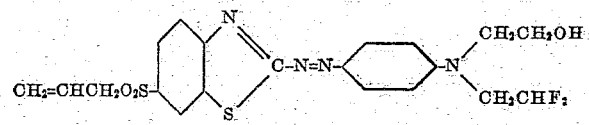

10. The azo compound having the formula:

References Cited in the file of this patent
UNITED STATES PATENTS

| | | |
|---|---|---|
| 2,040,928 | Engelmann | May 19, 1936 |
| 2,073,600 | Bayer et al. | Mar. 16, 1937 |
| 2,149,051 | Helberger | Feb. 28, 1939 |
| 2,355,675 | Knecht | July 18, 1944 |
| 2,441,612 | Argyle et al. | May 18, 1948 |
| 2,516,302 | Dickey | July 25, 1950 |
| 2,590,092 | Dickey | Mar. 25, 1952 |
| 2,659,719 | Dickey et al. | Nov. 17, 1953 |